United States Patent [19]
Carriere et al.

[11] Patent Number: 5,827,391
[45] Date of Patent: Oct. 27, 1998

[54] MACHINE FOR MARKING AN ELECTRIC CABLE

[75] Inventors: Pierre Carriere; Vincent Dabadie, both of Toulouse; Philippe Record; Jean-Luc Ballenghien, both of Blagnac, all of France

[73] Assignee: Aerospatiale Societe Nationale Industrielle, Paris, France

[21] Appl. No.: 729,744

[22] Filed: Oct. 7, 1996

Related U.S. Application Data

[60] Continuation of Ser. No. 518,308, Aug. 23, 1995, abandoned, which is a division of Ser. No. 389,727, Feb. 15, 1995, Pat. No. 5,474,627, which is a continuation of Ser. No. 197,559, Feb. 17, 1994, abandoned, which is a continuation of Ser. No. 836,281, filed as PCT/FR91/100780 Oct. 4, 1991, abandoned.

[30] Foreign Application Priority Data

Oct. 11, 1990 [FR] France ................................. 9012535

[51] Int. Cl.⁶ .................................................... B32B 31/00
[52] U.S. Cl. ................... 156/272.8; 156/277; 156/379.6; 156/380.9; 219/121.68
[58] Field of Search ...................... 156/47, 268, 272.8, 156/277, 379.6, 379.7, 380.9; 219/121.68

[56] References Cited

U.S. PATENT DOCUMENTS

| | | | |
|---|---|---|---|
| 3,657,510 | 4/1972 | Rothrock | 219/121 LA |
| 3,930,924 | 1/1976 | Oka et al. | 156/268 |
| 4,078,164 | 3/1978 | Pelletier et al. | 219/121 |
| 4,139,409 | 2/1979 | Mackin | 156/272.8 |
| 4,370,542 | 1/1983 | Mills et al. | 219/121 LH |
| 4,400,882 | 8/1983 | Thornton | 33/127 |
| 4,564,739 | 1/1986 | Mattelin | 219/121 |
| 4,636,043 | 1/1987 | Bellar | 350/484 |
| 4,715,100 | 12/1987 | Cross | 29/33 M |
| 4,720,618 | 1/1988 | Stamer et al. | 219/121 LH |
| 4,727,235 | 2/1988 | Stamer et al. | 219/121 LH |
| 4,735,670 | 4/1988 | Maurer et al. | 156/272.8 |
| 4,803,778 | 2/1989 | Cross | 29/857 |
| 4,808,966 | 2/1989 | Ferlier et al. | 338/214 |
| 4,874,919 | 10/1989 | Bransden et al. | 219/121.6 |
| 4,894,110 | 1/1990 | Lass et al. | 156/272.8 |
| 4,897,709 | 1/1990 | Yokoyama et al. | 357/68 |
| 4,961,080 | 10/1990 | Henderson et al. | 364/108 |
| 5,049,721 | 9/1991 | Parnas et al. | 219/121.68 |
| 5,063,137 | 11/1991 | Kiyonari et al. | 430/292 |
| 5,084,022 | 1/1992 | Claude | 604/164 |
| 5,111,523 | 5/1992 | Ferlier et al. | 385/100 |
| 5,130,721 | 7/1992 | Sukhman | 346/1.1 |
| 5,206,280 | 4/1993 | Williams | 524/409 |
| 5,300,321 | 4/1994 | Nakano et al. | 427/248.1 |

FOREIGN PATENT DOCUMENTS

| | | | |
|---|---|---|---|
| 0 0256 422 | 2/1988 | European Pat. Off. | |
| 0 353 121 | 1/1990 | European Pat. Off. | 156/272.8 |
| 0 436 221A1 | 7/1991 | European Pat. Off. | |
| 2 617 325 | 12/1988 | France | |
| 2 648 270 | 12/1990 | France | |
| 1 943 374 | 3/1971 | Germany | 156/272.8 |
| 0 190 794 | 11/1982 | Japan | 219/121.77 |
| 0 017 879 | 4/1989 | Japan | 156/272.8 |
| WO 92/07367 | 4/1992 | WIPO | |

*Primary Examiner*—David A. Simmons
*Assistant Examiner*—Paul M. Rivard
*Attorney, Agent, or Firm*—Fisher,Christen&Sabol

[57] ABSTRACT

The present invention provides a method and a machine for marking an electric cable that comprises a conductive core, an insulating coating, and a varnish comprising an outer layer and an inner layer of contrasting colors, with the marking being performed by ablating the outer layer of said varnish with a laser, the outer layer of varnish being based on polytetrafluoroethylene and being 10 $\mu$m to 20 $\mu$m thick. According to the invention the machine comprises:

a pulsed $CO_2$ laser (2) whose power is adjusted to obtain an energy density lying in the range 8 J/cm² to 15 J/cm² at the outer layer of the cable varnish;

drive means (9) for driving the cable (4) so as to cause it to run past the laser beam (5);

guide means (13, 14, 15) for guiding the cable (4) in the vicinity of the point of impact of said beam (5) on the cable; and computerized control means (6).

9 Claims, 2 Drawing Sheets

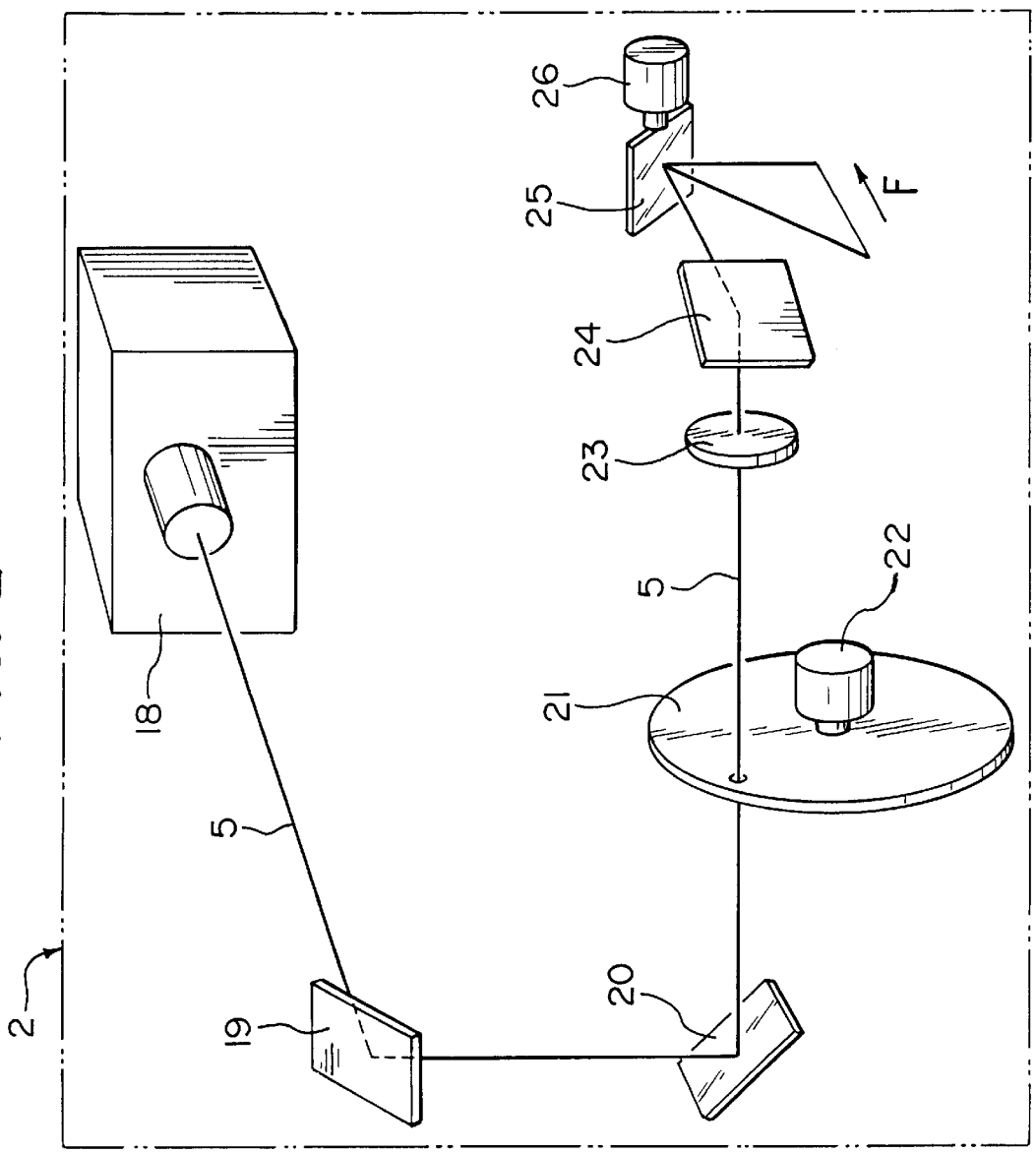
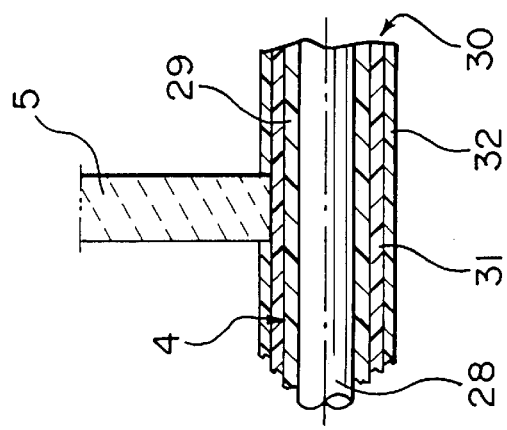

MACHINE FOR MARKING AN ELECTRIC CABLE

This application is a continuation of application Ser. No. 08/518,308 filed on Aug. 23, 1995, now abandoned, which is a division of application Ser. No. 08/389,727 filed on Feb. 15, 1995, now U.S. Pat. No. 5,474,627, which is a continuation of application Ser. No. 08/197,559 filed on Feb. 17, 1994, now abandoned, which is a continuation of application Ser. No. 07/836,281, filed as PCT/FR91/100780 Oct. 4, 1991, now abandoned.

The present invention relates to a method of marking an electric cable, and also to a machine for implementing the method.

Electric cables, and in particular aviation cables are usually printed by hot stamping using a matrix that embeds a portion of marker tape in the outer layer of the cable. The marking operation itself is performed while the cable is stationary, thereby providing a mean marking speed of about 20 cm/s.

However, that type of marking suffers from certain drawbacks:

there is a risk of the cable being damaged by its insulation being nicked, and there is also a risk of the marking disappearing over time;

this type of marking cannot be applied to sheathed, screened, twisted two-wire cables; and the rate of marking is low because of the stops that occur on each occasion a marking operation is performed.

That is why proposals have been made to mark an electric cable by means of a laser. Under such circumstances, the cable comprising a conductive core and an insulating covering is additionally covered with a varnish made up of an inner layer and an outer layer of contrasting colors. Marking then takes place by ablation of the outer layer of varnish, thereby revealing the contrasting inner layer.

However, that technique suffers from difficulties in so far as the laser radiation must reach said inner layer without ever going through it so as to avoid damaging the insulating covering which would give rise to unacceptable cable damage. Up to now, such difficulties have prevented this technique being used in practice.

An object of the present invention is to avoid these drawbacks and the invention relates to a method making it possible to mark an electric cable reliably and reproducibly without running the risk of damaging the cable.

To this end, a method of marking an electric cable comprising a conductive core, an insulating coating, and a varnish made up of an inner layer and an outer layer of contrasting colors, the marking being obtained by ablating the outer layer of said varnish by means of a laser, the outer layer of varnish being based on polytetrafluoroethylene and having a thickness lying in the range 10 $\mu$m to 20 $\mu$m, is remarkable, according to the invention, in that the laser used is a pulsed $CO_2$ laser, and in that the power of the laser is adjusted so as to obtain an energy density lying in the range 8 J/cm$^2$ to 15 J/cm$^2$ at the outer layer of the varnish.

Thus, by using a pulsed $CO_2$ laser whose power is adjusted to obtain the specified range of energy densities at the outer layer of the varnish it is guaranteed firstly that the outer layer of the varnish is ablated, thus ensuring that the cable is clearly marked, and secondly that the inner layer is never completely removed, thereby a fortiori ensuring the integrity of the insulating coating. It should also be observed that such a method is equally applicable to single wire cables and to screened twisted two-wire cables.

A preferred range of energy densities is 10 J/cm$^2$ to 13 J/cm$^2$. Within said range, a value which is at least approximately equal to 11 J/cm$^2$ provides results that are particularly favorable.

Advantageously, the cable is marked continuously with the cable running at a speed lying in the range 0.1 m/s to 1 m/s, and preferably at a speed at least approximately equal to 0.5 m/s.

The maximum speed of 1 m/s which the cable may run is compatible with marking that is perfectly clear given the laser exposure time (about 0.1 microseconds) and the frequency at which it operates.

The present invention also provides a machine for implementing the above-described method which, according to the invention, is remarkable in that it comprises:

a pulsed $CO_2$ laser whose power is adjusted to obtain an energy density lying in the range 8 J/cm$^2$ to 15 J/cm$^2$ at the outer layer of the cable varnish;

drive means for driving the cable so as to cause it to run past the laser beam;

guide means for guiding the cable in the vicinity of the point of impact of said beam on the cable; and computerized control means.

Advantageously, said means for guiding the cable comprise a pair of moving jaws guiding the cable laterally as a function of the different gauges of cable to be marked, and two flat-bottomed pulleys enabling the surface to be marked on the cable to be maintained at the same level regardless of the diameter of the cable.

In addition, the machine may include detection means for detecting connections between different lengths of cable and for detecting possible defects in the cable, said means being disposed upstream from said laser. In particular, said detection means comprise a laser associated with a photoelectric cell.

Advantageously, the machine may include means for measuring the force exerted on the cable and for damping large accelerations thereof, and/or means for cutting the cable, said means being disposed downstream from said drive means.

Preferably, the laser is associated with a system of reflecting mirrors and a mask having characters to be marked on the cable machined therein and interposed on the laser beam. In particular, said mask is made in the form of a rotary disk.

Advantageously, the laser is additionally associated with scanning means for scanning the beam parallel to the running direction of the cable, which scanning means may be constituted, in particular, by a pivoting mirror.

The figures of the accompanying drawings make it well understood how the invention may be implemented.

FIG. 2 is a more detailed view showing how the laser of the FIG. 1 machine is arranged.

FIG. 3 is a longitudinal section through a length of cable marked by the laser.

Figure 1:
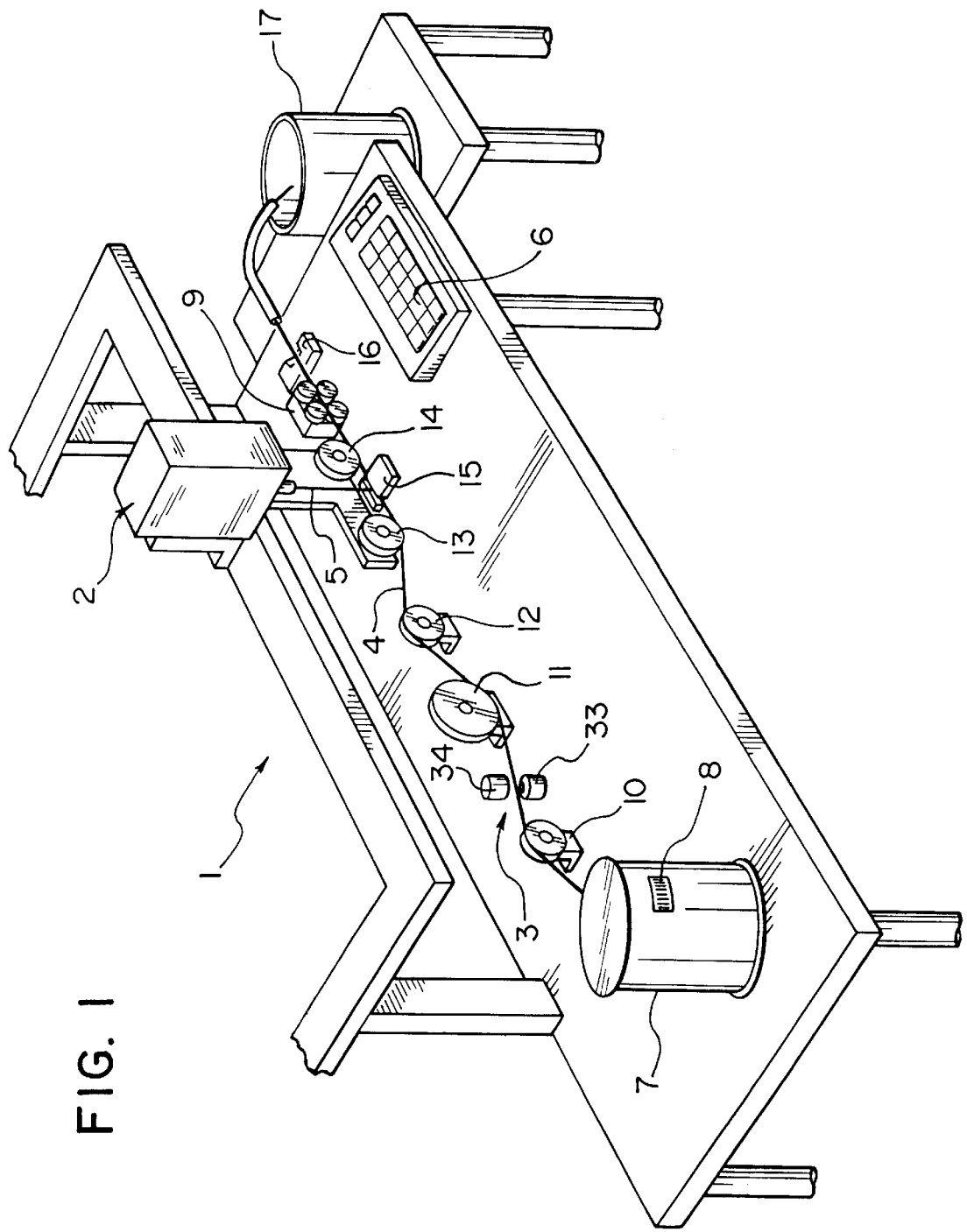
FIG. 1 is a diagrammatic perspective view of an embodiment of a machine for implementing the method of the invention.

FIG. 1 is a diagrammatic perspective view showing a machine 1 for implementing the method of the invention. In general manner, the machine 1 comprises a laser unit 2, a device 3 for causing the cable 4 that is to be marked to run past the beam 5 of laser radiation, and a computerized control unit 6.

More precisely, the device 3 includes a reel of cable 7, having a bar code label 8 which supplies, inter alia, the type and the gauge of the cable 4. The machine can only begin to pay out the cable after said data has been picked up by a light pen, with successful data capture providing the necessary authorization. The device 3 further includes drive means 9 of any appropriate type for driving the cable 4, the drive means being under the control of a rotary encoder 11 whose function is explained below. Two flat-bottomed pulleys 13 and 14 serve to keep the surface to be marked at the same level regardless of the diameter of the cable. A cable guiding support 15 is provided between the two pulleys 13 and 14 and is constituted by two moving jaws that fit automatically against different gauges of cables to be marked for the purpose of guiding them laterally. Downstream from the drive means 9 there are a cable cutter 16 which provides a clean cut that requires no subsequent alteration and a receptacle 17 for cables that are marked and cut.

The force exerted on the cable is measured continuously by a traction pickup 12, and large accelerations of the cable are damped by a compensation damper 10. Connections between various lengths of cable (connection splices) and possible defects (such as knots) are detected by means of a small laser 33 which emits towards a photoelectric cell 34 and which serves to measure diameter difference continuously and to stop the cable from running.

FIG. 2 is a diagram of the laser unit 2. This unit comprises the laser per se 18 which is a pulsed $CO_2$ laser having a recurrence frequency of 100 Hz, and a wavelength $\lambda=10.6$ $\mu$m, together with a system of mirrors 19, 20, 24 for reflecting the beam 5 of laser radiation, and a rotary disk 21 that is driven by a motor 22 and that acts as a mask. The rotary disk may include two series of characters (for small gauges and for large gauges), that are radially spaced apart and are reproduced a certain number of times (e.g. twelve) in order to minimize disk displacement between two characters, and thus minimize its speed of rotation. The speed of rotation is synchronized with the recurrence frequency of the laser. Switching from one series of characters to the other is done by pivoting a mirror that reflects the beam. To clarify the drawing, these series of characters are not shown on the disk 21.

Downstream from the disk 21 in the direction of propagation of the beam 5, there are a lens 23, and a pivoting mirror 25 under the control of a motor 26 enabling the beam 5 to be scanned parallel to the running direction of the cable 4 (arrow F).

A cable 4 suitable for marking by the method of the invention is shown diagrammatically in FIG. 3. The cable 4 has a conductive core 28, an insulating coating 29, and a varnish 30 comprising an inner layer 31 and an outer layer 32 of contrasting colors. The inner layer may be dark and the outer layer may be pale, or vice versa. Both of these layers may be Teflon (registered trademark) either polytetrafluoroethylene (PTFE) or else fluorinated ethylene-propylene (FEP). The thickness of the inner layer 31 may lie in the range 25 $\mu$m to 30 $\mu$m, and the thickness of the outer layer 32 may lie in the range 10 $\mu$m to 20 $\mu$m. The colors of the inner and outer layers may be obtained by adding suitable pigments.

As mentioned above, during the marking operation, the power of the laser is adjusted by regulating the high tension of the laser so as to obtain an energy density lying in the range 8 $J/cm^2$ to 15 $J/cm^2$ on the outer layer 32 of the varnish 30 of the cable 4, said energy density advantageously lying in the range 10 $J/cm^2$ to 13 $J/cm^2$, and a value of 11 $J/cm^2$ being the most preferred.

These values guarantee firstly that the outer layer 32 of the varnish 30 is ablated, and thus that the cable is clearly marked, and secondly that the inner layer 31 is not totally removed, thereby a fortiori ensuring the integrity of the insulating coating 29.

The controlling computer unit 6 serves to control the running of the cable with the help of the rotary encoder, and to stop marking particularly whenever the above-mentioned ranges of values are in danger of being exceeded. In addition, it selects the characters to be marked on a given cable or cable portion, and each automatically selected character is thus marked on the cable by ablation of the pale outer layer of the varnish, thereby revealing the dark inner layer. It also serves to control the positioning of the jaws 15 as a function of the gauge of the cable 4, and the cutting up of the cable into desired lengths.

The machine of the invention ensures that an electric cable is marked clearly without any risk of damaging the cable, and this may be done at a maximum cable running speed of 1 meter per second (m/s), given the exposure time of the laser and the recurrence frequency at which it operates.

We claim:

1. A machine for continuously marking characters on a running electric cable comprising:
    (a) a pulsed $CO_2$ laser which provides a laser beam;
    (b) drive means for driving the cable so as to cause it to run past the laser beam;
    (c) guide means for guiding the cable in the vicinity of the point of impact of said beam on the cable;
    (d) computerized control means;
    (e) mask having characters to be marked on the cable machined therein and interposed on the laser beam; and
    (f) stationary scanning means for scanning the laser beam parallel to the running direction of the cable, the laser beam, having a cross section shape of the interposed characters, contacting an area of the running cable to be marked, the laser beam being scanned at speed necessary to maintain contact with the area of the running cable to be marked as the cable moves, whereby said characters are clearly marked on said running cable.

2. A machine according to claim 1, wherein said means for guiding the cable comprise a pair of moving jaws guiding the cable laterally as a function of the different gauges of cable to be marked, and two flat-bottomed pulleys enabling the surface to be marked on the cable to be maintained at the same level regardless of the diameter of the cable.

3. A machine according to claim 1, further comprising detection means for detecting connections between different lengths of cable and for detecting possible defects in the cable, said detection means being disposed upstream from said laser.

4. A machine according to claim 3, wherein said detection means comprise a laser associated with a photoelectric cell.

5. A machine according to claim 1, further comprising means for measuring the force exerted on the cable and for damping large accelerations thereof.

6. A machine according to claim 1, further comprising means for cutting the cable, said cable cutting means being disposed downstream from said drive means.

7. A machine according to claim 1, wherein said mask is made in the form of a rotary disk.

8. A machine according to claim 1, wherein said scanning means include a pivoting mirror.

9. A machine according to claim 1, wherein the stationary scanning means comprises a stationary pivoting mirror under the control of a motor enabling the laser beam to be scanned parallel to the running direction of the cable.

* * * * *